W. J. CROWELL, Jr.
INDICATING, RECORDING, AND INTEGRATING DYNAMOMETER.
APPLICATION FILED MAR. 5, 1909.
945,757.
Patented Jan. 11, 1910.
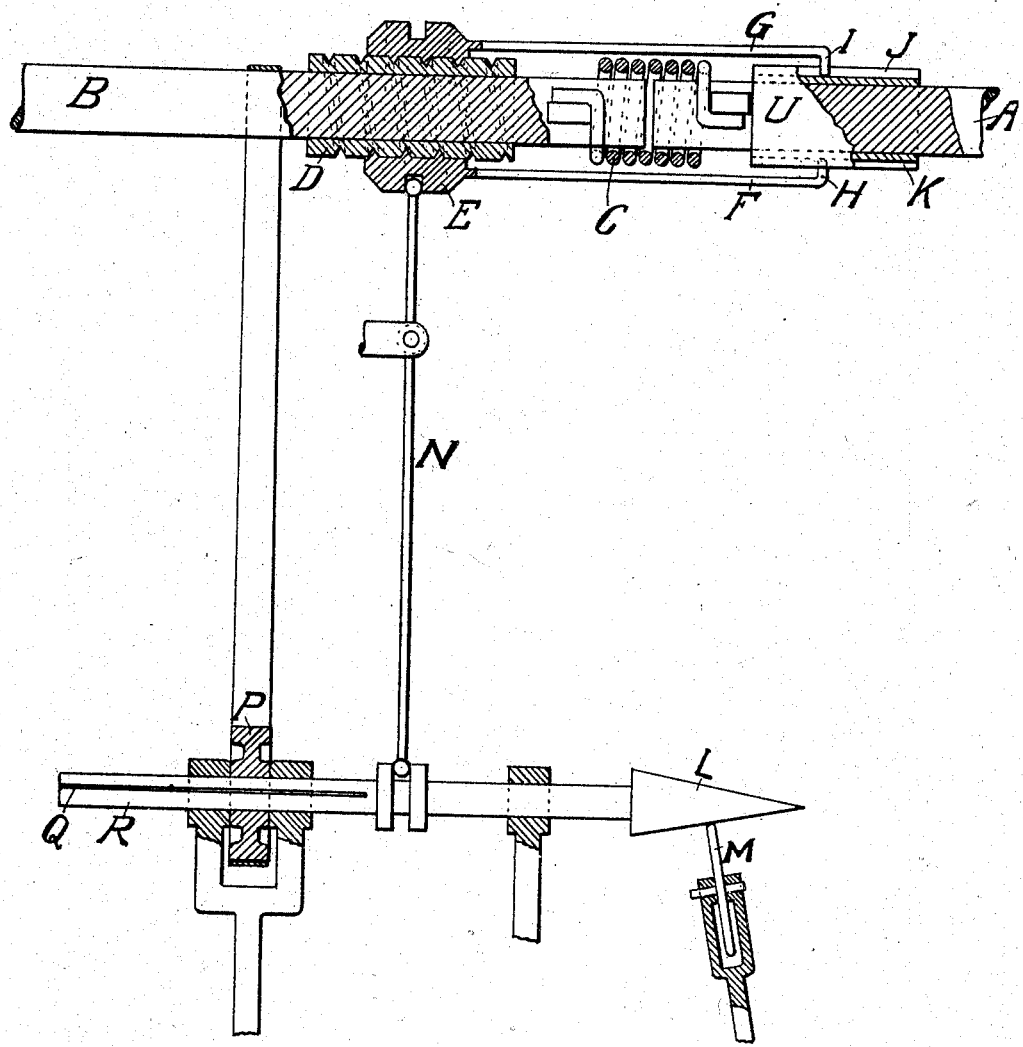

UNITED STATES PATENT OFFICE.

WILLIAM J. CROWELL, JR., OF LEBANON, PENNSYLVANIA.

INDICATING, RECORDING, AND INTEGRATING DYNAMOMETER.

945,757.            Specification of Letters Patent.     Patented Jan. 11, 1910.

Application filed March 5, 1909. Serial No. 481,513.

*To all whom it may concern:*

Be it known that I, WILLIAM J. CROWELL, Jr., a citizen of the United States, residing at Lebanon, in the county of Lebanon and State of Pennsylvania, have invented new and useful Improvements in Indicating, Recording, and Integrating Dynamometers, of which the following is a specification.

My invention is a dynamometer that does not receive, either to consume or to transmit, the power which it measures, continuously records, or integrates. With the aid of a spring-coupling between two revolving shafts, it gives to an auxiliary wheel a turning velocity proportional at the same time both to the common shaft velocity and to the torsion between the two said coupled-together shafts, and consequently a turning velocity proportional to the power transmitted from one of said shafts to the other; and by measuring the turning velocity of this auxiliary wheel, in any suitable way, it gives, with proper calibration, a measure of the power transmitted at time of said measurement from one of said shafts to the other; and by continuously recording, in any suitable way, the velocity of this auxiliary wheel it gives, with proper calibration, a continuous record of the power transmitted from one of said shafts to the other; and by integrating, in any suitable way (as with a revolution counter), the velocity of said auxiliary wheel during any period (*i. e.*, by determining the total revolutions of said auxiliary wheel during said period) it gives, with proper calibration, the total energy (*e. g.*, in horse power hours) transmitted from one of said shafts to the other during said period. Following is a specific description of a preferable form of apparatus to give, with the aid of said spring-coupling, a turning velocity to said auxiliary wheel proportional both to shaft velocity and to shaft torsion, and therefore to shaft power transmission.

The drawing represents a horizontal sectional view of the apparatus.

In the drawing, A and B are two shafts, in line, and coupled together by the said spring-coupling C.

D is a bushing fixed to the shaft B, and having on its outer surface a screw thread of large uniform pitch meshing into a corresponding screw thread on the inner surface of a second bushing or nut, E. A relative turning of the second bushing or nut E and the shaft B, causes the said second bushing or nut E to move along the shaft B, the amount of this rectilinear motion from its initial position being proportional to the amount of said relative turning. F and G are arms fastened rigidly to the said second bushing or nut E, the outer ends of which, H and I, fit into slots J and K in a bushing U upon the shaft A, the arrangement being such as to prevent any relative turning between shaft A and the said second bushing or nut E, but not to prevent any rectilinear motion of the said second bushing or nut E along shaft B; the said outer ends, H and I, of said arms F and G, in such case sliding in the slots J and K.

A torsion between shaft A and shaft B, resisted by the spring-coupling C, will cause a relative turning of shaft A and shaft B, and the same relative turning of the said second bushing or nut E and shaft B. The amount of this turning from position with zero torsion is proportional to the torsion between the said shafts, and therefore the amount of the consequent rectilinear motion of the said second bushing or nut E from its position with zero torsion is likewise proportional to the amount of said torsion between shaft A and shaft B.

L is a friction cone pulley. M is the said auxiliary wheel, a friction wheel, and driven by said cone pulley L. The turning velocity of said wheel M is proportional to the turning velocity of the cone pulley L and also proportional to the distance from the apex of said cone L to that part of said cone L which drives the said wheel M. N is a lever which transmits the rectilinear motion of said second bushing or nut E to the cone pulley L, the motion transmitted being rectilinear, in line with the cone axis, and proportional in amount to the rectilinear motion of said second bushing or nut E, and therefore to the torsion between shaft A and shaft B. The wheel M is free to move at right angles to its axis, but cannot move in the direction of its axis. With zero torsion between shaft A and shaft B the bearing position of wheel M is at the apex of the cone L. As the torsion between shaft A and shaft B increases cone L moves forward, the amount of forward motion being proportional to the torsion, and said wheel M slides up along said cone L, its new bearing position being at a distance from the cone apex proportional to the torsion between shaft A and shaft B. The cone pulley L is driven by belt from shaft B to the feathered pulley P. This feathered pulley P cannot move rectilinearly, but its feather fitting into a slot Q in the shaft R of the cone pulley L, permits motion of the cone pulley L and its shaft R as above described. The velocity of the cone pulley L is thus proportional to the common velocity of shaft A and shaft B and the distance from the apex of cone L to that part of cone L which drives the wheel M is proportional to the torsion between shaft A and shaft B. This condition produces a velocity in said wheel M constantly proportional to the power transmitted from one of said shafts to the other.

Claim.

In measuring, continuously recording, or integrating the power transmitted to or from a revolving shaft, an apparatus comprising a spring-coupling between two revolving shafts, said shafts hereinafter called shaft A and shaft B; a bushing fixed to shaft B, having upon its outer surface a screw thread meshing into a corresponding screw thread on the inner surface of a second bushing or nut kept from turning relatively to shaft A by fixed arms, the outer ends of which fit into slots in a bushing fixed upon shaft A, the arrangement being such that any relative turning of shaft A and shaft B will cause an equal relative turning of shaft B and the said second bushing or nut, and consequently a rectilinear motion of said second bushing or nut along shaft B proportional to the amount of relative turning between shaft A and shaft B; suitable means to transmit said rectilinear motion of said second bushing or nut to a cone pulley, the motion thus transmitted being rectilinear, in line with the cone axis and proportional in amount to the said rectilinear motion of the said second bushing or nut; suitable means to give said cone a turning velocity proportional to the common turning velocity of shaft A and shaft B; a wheel driven by said cone, placed so that the distance from the said cone's apex to that part of the cone which drives said wheel shall vary proportionally with the amount of rectilinear motion of said second bushing or nut, and therefore vary proportionally with the amount of relative turning of shaft A and shaft B, so that the turning velocity of said wheel, being proportional to both shaft torsion and shaft velocity, shall be proportional to the power transmitted by said shaft.

WM. J. CROWELL, Jr.

Witnesses:
   Jos. Linscert,
   Carlos T. Chester.